US010758997B2

(12) United States Patent
Yu et al.

(10) Patent No.: US 10,758,997 B2
(45) Date of Patent: Sep. 1, 2020

(54) EXOTHERMIC WELDING APPARATUS AND EXOTHERMIC WELDING METHOD (71) Applicant: SICHUAN SUNLIGHT INTELLIGENT ELECTRIC EQUIPMENT CO., LTD., Sichuan (CN)

(72) Inventors: Xudong Yu, Sichuan (CN); Fanjiao Chen, Sichuan (CN); Zhoubo Lv, Sichuan (CN)

(73) Assignee: SICHUAN SUNLIGHT INTELLIGENT ELECTRIC EQUIPMENT CO., LTD. . ., Sichuan (CN)

( * ) Notice: Subject to any disclaimer, the term of this patent is extended or adjusted under 35 U.S.C. 154(b) by 194 days.

(21) Appl. No.: 16/021,887

(22) Filed: Jun. 28, 2018

(65) Prior Publication Data
US 2019/0143446 A1    May 16, 2019

Related U.S. Application Data (63) Continuation-in-part of application No. PCT/CN2017/110823, filed on Nov. 14, 2017.

(51) Int. Cl.
*B23K 23/00* (2006.01)
*B23K 1/06* (2006.01)
*B23K 20/16* (2006.01)

(52) U.S. Cl.
CPC .......... *B23K 23/00* (2013.01); *B23K 1/06* (2013.01); *B23K 20/165* (2013.01)

(58) Field of Classification Search
CPC .......... B23K 2101/38; B23K 1/0006; B23K 20/165; B23K 23/00
(Continued)

(56) References Cited

U.S. PATENT DOCUMENTS 3,751,308 A * 8/1973 Bishop ............... C21D 9/50
148/515
4,658,886 A * 4/1987 Carlson ............... B22C 1/00
164/364
(Continued)

FOREIGN PATENT DOCUMENTS

FR           324534 A  *  4/1903  ............. C22B 5/04
WO   WO-2012159607 A1 *  11/2012  ............. C22C 29/12

OTHER PUBLICATIONS

Machine translation of FR-324534-A (no date available).*

*Primary Examiner* — Kiley S Stoner
(74) *Attorney, Agent, or Firm* — Marshall, Gerstein & Borun LLP (57) ABSTRACT

An exothermic welding apparatus and an exothermic welding method, belonging to the exothermic welding field are provided. The exothermic welding apparatus includes a mold, an igniter and an electronic starter, the mold has a holding space configured to accommodate an exothermic welding flux, the igniter includes a heating wire, a first conductor wire and a first connector, the heating wire is configured to ignite the exothermic welding flux directly, one end of the first conductor wire is electrically connected to the heating wire, the other end of the first conductor wire is electrically connected to the first connector, and the electronic starter cooperates with the first connector and is configured to supply power to the first connector. The exothermic welding apparatus can ignite an exothermic welding flux by supplying power with an electronic starter.

18 Claims, 8 Drawing Sheets

(58) Field of Classification Search
USPC .................................................. 228/234.3
See application file for complete search history.

(56) References Cited

U.S. PATENT DOCUMENTS

| | | | | |
|---|---|---|---|---|
| 4,879,452 A * | 11/1989 | Kovarik | ................. | B23K 23/00 219/130.4 |
| 4,881,677 A * | 11/1989 | Amos | ................... | B23K 23/00 228/33 |
| 4,885,452 A * | 12/1989 | Amos | ................... | B23K 23/00 219/130.4 |
| 4,889,324 A * | 12/1989 | Brosnan | ................. | B23K 23/00 266/157 |
| 5,145,106 A * | 9/1992 | Moore | ................... | B23K 23/00 228/234.3 |
| 5,151,202 A * | 9/1992 | Bommart | ............... | B23K 23/00 164/54 |
| 5,215,139 A * | 6/1993 | Swartz | ................... | B23K 23/00 164/138 |
| 5,279,455 A * | 1/1994 | Fuchs | ................... | B23K 23/00 228/234.3 |
| 5,419,484 A * | 5/1995 | Radulescu | ............. | B23K 23/00 228/234.3 |
| 5,490,888 A * | 2/1996 | Assel | ..................... | B23K 23/00 149/108.2 |
| 5,515,904 A * | 5/1996 | Radulescu | ............. | B23K 23/00 164/133 |
| 5,582,228 A * | 12/1996 | Stidham | ................ | B23K 23/00 164/54 |
| 5,647,425 A * | 7/1997 | Foutz | .................... | B23K 23/00 164/54 |
| 5,653,279 A * | 8/1997 | Foutz | .................... | B23K 23/00 164/54 |
| 5,715,886 A * | 2/1998 | Fuchs | ................... | B23K 23/00 164/54 |
| 5,829,510 A * | 11/1998 | Fuchs | ................... | B23K 23/00 164/54 |
| 5,954,261 A * | 9/1999 | Gaman | ................. | B23K 23/00 228/33 |
| 6,152,349 A * | 11/2000 | Thuru | ................... | B23K 23/00 104/15 |
| 6,382,496 B1 * | 5/2002 | Harger | ................. | B23K 23/00 228/234.3 |
| 6,411,190 B1 * | 6/2002 | Yamaguchi | ............ | H01H 39/00 180/279 |
| 6,483,420 B1 * | 11/2002 | Takahashi | ............ | H01H 85/044 180/274 |
| 6,776,386 B1 * | 8/2004 | Morrissey | ............. | B23K 23/00 164/54 |
| 7,293,687 B2 * | 11/2007 | Weil | .................... | B21C 37/0818 228/44.3 |
| 7,922,068 B2 * | 4/2011 | Jury | ........................ | B23K 23/00 228/234.3 |
| 7,946,466 B1 * | 5/2011 | Lofton | .................. | B23K 23/00 228/18 |
| 7,975,900 B2 * | 7/2011 | Lofton | .................. | B22D 19/04 228/51 |
| 8,573,466 B2 * | 11/2013 | Duart Lvarez De Cienfuegos | ..... | B23K 23/00 164/335 |
| 8,656,984 B2 * | 2/2014 | Winiar | ................... | B23K 23/00 164/333 |
| 9,399,265 B2 * | 7/2016 | Duart Lvarez Cienfuegos | ........... | B23K 23/00 |
| 10,207,359 B2 * | 2/2019 | Workman | .............. | B23K 23/00 |
| 10,357,840 B2 * | 7/2019 | Gleisberg | ................ | B23K 1/19 |
| 10,464,164 B2 * | 11/2019 | Hefer | ..................... | B23K 23/00 |
| 2002/0104953 A1 * | 8/2002 | Triantopoulos | ........ | B23K 23/00 249/86 |
| 2003/0006272 A1 * | 1/2003 | Cordier | ................. | B23K 23/00 228/234.3 |
| 2003/0116693 A1 * | 6/2003 | Hantusch | .............. | B23K 23/00 249/86 |
| 2003/0178168 A1 * | 9/2003 | Triantopoulos | ........ | B23K 23/00 164/54 |
| 2003/0221578 A1 * | 12/2003 | Forman | .................. | F42B 3/103 102/202.7 |
| 2004/0003907 A1 * | 1/2004 | Moore | .................. | B23K 23/00 164/54 |
| 2004/0149333 A1 * | 8/2004 | Johansen | ............. | F16K 24/044 137/202 |
| 2004/0222274 A1 * | 11/2004 | Harger | .................. | B23K 23/00 228/234.3 |
| 2006/0054626 A1 * | 3/2006 | Delcroix | ................ | B23K 23/00 220/371 |
| 2007/0017955 A1 * | 1/2007 | Siracki | ................... | B23K 23/00 228/2.5 |
| 2007/0107869 A1 * | 5/2007 | Lofton | ................... | B23K 23/00 164/54 |
| 2007/0272114 A1 * | 11/2007 | Delcroix | ................ | B22C 9/02 104/2 |
| 2008/0061039 A1 * | 3/2008 | Danks | .................... | B23K 25/00 219/73.1 |
| 2009/0173873 A1 * | 7/2009 | Stidham | ................. | B23K 23/00 249/83 |
| 2010/0163607 A1 * | 7/2010 | Viseur | .................... | B23K 23/00 228/234.3 |
| 2011/0132967 A1 * | 6/2011 | Lofton | ................... | B22D 19/04 228/33 |
| 2011/0240244 A1 * | 10/2011 | Sepelak | ................. | B22D 19/04 164/54 |
| 2012/0055979 A1 * | 3/2012 | Alghusain | .............. | B23K 23/00 228/198 |
| 2012/0255699 A1 * | 10/2012 | Sepelak | .................... | B22C 9/06 164/54 |
| 2013/0105560 A1 * | 5/2013 | Duart Lvarez De Cienfuegos | ..... | B23K 23/00 228/198 |
| 2014/0182803 A1 * | 7/2014 | Thuru | .................... | B23K 23/00 164/54 |
| 2015/0021377 A1 * | 1/2015 | Rudd | ................... | B23K 35/362 228/198 |
| 2015/0041520 A1 * | 2/2015 | Pomar Garcia | ........ | B23K 23/00 228/33 |
| 2015/0219334 A1 * | 8/2015 | Harger | ...................... | F42B 3/10 431/6 |
| 2015/0328716 A1 * | 11/2015 | Duart Lvarez Cienfuegos | ........... | B23K 23/00 164/54 |
| 2016/0121395 A1 * | 5/2016 | Kawanaka | ............... | C09K 5/16 428/642 |
| 2016/0311063 A1 * | 10/2016 | Hoagland | .............. | B23K 37/06 |
| 2017/0028504 A1 * | 2/2017 | Workman | .............. | B23K 23/00 |
| 2017/0348795 A1 * | 12/2017 | Abedraboh | .......... | B23K 20/165 |
| 2019/0001431 A1 * | 1/2019 | Stilwell | .................. | B23K 23/00 |
| 2019/0009980 A1 * | 1/2019 | McDuffe | ................. | E02D 31/00 |
| 2019/0054557 A1 * | 2/2019 | Ruland | .............. | B23K 37/0205 |
| 2019/0101288 A1 * | 4/2019 | Hoagland | ................ | F23Q 1/02 |
| 2019/0127925 A1 * | 5/2019 | Bordery | ................. | B23K 23/00 |
| 2019/0389014 A1 * | 12/2019 | Yu | .......................... | B23K 37/06 |

* cited by examiner

EXOTHERMIC WELDING APPARATUS AND EXOTHERMIC WELDING METHOD

CROSS-REFERENCE TO RELATED APPLICATIONS

The present application is a continuation-in-part application based on PCT Application No. PCT/CN2017/110823, filed on Nov. 14, 2017 and entitled "Exothermic Welding Apparatus and Exothermic Welding Method", the content of which is incorporated herein by reference in its entirety.

TECHNICAL FIELD

The present disclosure relates to the field of exothermic welding, specifically to an exothermic welding apparatus and an exothermic welding method.

BACKGROUND ART

At present, the mode of igniting an exothermic welding flux with an ignition agent is usually applied to the ignition of exothermic welding flux, while the high instability of ignition agent leads to reduction of safety factor. Moreover, the mode of igniting an exothermic welding flux with an ignition agent leads to increased cost, which adversely affects the industrial manufacture. In terms of the current technology in the art, it is difficult to achieve a continuous and stable high temperature to ignite an exothermic welding flux, thus the mode of ignition agent have to be used until the present.

The present inventors found from his researches that there are at least the following disadvantages in conventional exothermic welding processes:
 low safety factor of construction operation,
 complex operation, and
 high cost.

SUMMARY

An object of the present disclosure is to provide an exothermic welding apparatus to ameliorate the deficiencies in the prior art, which exothermic welding apparatus is able to ignite an exothermic welding flux by supplying power with an electronic starter, provides a safety distance by the cooperation of an igniter and an electronic starter, increasing the safety factor, and reduces the cost and increases the operation efficiency compared with the prior art.

Another object of the present disclosure is to provide an exothermic welding method, which allows safely fulfilling the entire exothermic welding process by utilizing the above described exothermic welding apparatus.

The examples of the present disclosure are implemented as follows:

The examples of the present disclosure provide an exothermic welding apparatus, including:
 a mold, having a holding space configured to accommodate an exothermic welding flux;
 an igniter, including a heating wire, a first conductor wire and a first connector, wherein the heating wire is configured to ignite the exothermic welding flux directly, an end of the first conductor wire is electrically connected to the heating wire, and the other end of the first conductor wire is electrically connected to the first connector; and
 an electronic starter, configured to cooperate with the first connector and supply power to the first connector.

Specifically, the exothermic welding apparatus is able to ignite an exothermic welding flux by supplying power with an electronic starter, provide a safety distance by the cooperation of an igniter and an electronic starter to increase the safety factor, and reduce the cost and increase the operation efficiency as compared with the prior art.

Optionally, the exothermic welding flux is in a shape of a frustum cone, and the shell of the exothermic welding flux is made of copper, aluminum, steel or moisture-proof paper.

Optionally, the opening of the shell is sealed with an aluminum sheet.

Optionally, the aluminum sheet and the shell are fixed by using stainless steel ring to form one piece.

Optionally, the stainless steel ring has a first gripping portion, a transition portion and a second gripping portion which are connected sequentially, wherein the first gripping portion and the second gripping portion are provided oppositely, the first gripping portion covers the upper surface of the aluminum sheet, and the second gripping portion is attached to the lower surface of the edge of opening of the shell.

Optionally, the igniter further includes fixing heads, wherein each fixing head has a clamping space, an end of the heating wire is clamped in the clamping space, and an end of the first conductor wire is also clamped in the clamping space.

Optionally, the igniter further includes positioning portions, wherein each positioning portion is connected to the other end of one fixing head which is opposite to one end thereof connected with the first conductor wire, and the positioning portion is used for keeping sufficient contact between the heating wire and the solder of the exothermic welding flux.

Optionally, the positioning portion bends in a direction away from the plane where two fixing heads are located.

Optionally, the positioning portion is made of a conductive material, and the end of the positioning portion, away from the fixing head, is provided thereon with an insulation head.

Optionally, the fixing head is provided therein with a conductive layer, wherein an end of the heating wire is in contact with the first conductive layer, and an end of the first conductor wire is also in contact with the conductive layer.

Optionally, the fixing head includes a fixing piece, wherein the fixing piece is embodied as a rectangular frame with an opening at its bottom, the fixing piece includes a first portion, a second portion and a third portion which are connected sequentially; the end of the first portion, away from the second portion, extends in a direction toward a line perpendicular to the second portion at a middle point of the second portion; the end of the third portion, away from the second portion, extends in a direction toward a line perpendicular to the second portion at a middle point of the second portion; and the first portion, the second portion and the third portion, in combination, define the clamping space.

Optionally, the heating wire includes a first connection portion, a heating portion and a second connection portion, wherein the first connection portion is connected to the positive end of the first conductor wire, the second connection portion is connected to the negative end of the first conductor wire, an end of the heating portion is connected to the first connection portion, the other end of the heating portion is connected to the second connection portion, and the heating portion is in a helix shape.

Optionally, the end of the first connection portion connected to the heating portion is a first connection end, the end of the second connection portion connected to the heating portion is a second connection end, and the heating portion is formed by helically coiling, with a line connecting the first connection end and the second connection end taken as an axis.

Optionally, an end of the first connector is provided with two sockets, and the positive end and the negative end of the first conductor wire are respectively clamped in the two sockets and are relatively fixed to the first connector.

Optionally, the electronic starter includes a casing and a second conductor wire, wherein the casing is provided therein with a wire coil configured for winding of the second conductor wire and a power source configured to supply power to the second conductor wire, one side of the casing is provided with a first opening configured to allow the second conductor wire to pass therethrough, the end of the second conductor wire extending out of the first opening is provided with a second connector, and the first connector is detachably connected with the second connector.

Optionally, a first switch is provided between the second conductor wire and the power source.

Optionally, the wire coil is rotatably connected to the casing, the wire coil is provided with a first side plate, the first side plate is located at the outside of the casing, and the side of the first side plate away from the casing is provided with a groove.

Optionally, the first switch is a slide switch, and the controlling end of the slide switch is provided in the groove.

Optionally, a second switch is provided between the second connector and the second conductor wire.

The examples of the present disclosure further provide an exothermic welding method using the above described exothermic welding apparatus, and this exothermic welding method includes:

inserting the heating wire into an exothermic welding flux, and placing the exothermic welding flux in the holding space;

making the first connector cooperated with the electronic starter;

making the electronic starter supply power to the first connector; and making the igniter powered off, waiting until the exothermic welding is finished and taking out the finished product.

Compared with the prior art, the beneficial effects of the examples of the present disclosure are:

in conclusion, the exothermic welding apparatus is able to ignite an exothermic welding flux by supplying power with an electronic starter, provides a safety distance by the cooperation of an igniter and an electronic starter to increase the safety factor, and reduces the cost and increases the operation efficiency compared with the prior art.

BRIEF DESCRIPTION OF DRAWINGS

In order to more clearly illustrate technical solutions of the examples of the present disclosure, figures which are needed for description of the examples will be introduced briefly below. It should be understood that the figures below merely show some examples of the present disclosure, and therefore should not be considered as limiting the scope. A person ordinary skilled in the art can still obtain other relevant figures according to these figures, without using creative efforts.

Reference numerals: 100—exothermic welding apparatus, 10—mold, 101—through hole, 11—first mold, 111—first accommodating cavity, 112—first forming cavity, 113—first through slot, 12—second mold, 121—second accommodating cavity, 122—second forming cavity, 123—second through slot, 13—covering mold, 131—communication passage, 132—communication slot, 20—exothermic welding flux, 21—shell, 22—aluminum sheet, 23—stainless steel ring, 231—first gripping portion, 232—transition portion, 233—second gripping portion, 30—igniter, 31—heating wire, 311—first connection portion, 3111—first connection end, 312—heating portion, 313—second connection portion, 3131—second connection end, 32—first conductor wire, 33—first connector, 331—socket, 34—fixing head, 35—fixing piece, 350—clamping space, 351—first portion, 352—second portion, 353—third portion, 40—electronic starter, 41—casing, 411—first opening, 412—column, 42—wire coil, 421—first side plate, 4211—groove, 422—winding reel, 4221—installation through hole, 423—second side plate, 43—circular retaining wall, 431—second opening, 44—power source, 45—second conductor wire, 46—second connector, 47—first switch, 48—second switch, 49—charging interface, 501—charging indicator light, 502—safety indicator light, 503—operation indicator light, 201—wire rod, 202—fastening block.

DETAILED DESCRIPTION OF EMBODIMENTS

In order to make the objects, technical solutions and advantages of the examples of the present disclosure clearer, the technical solutions in the examples of the present disclosure will be described below clearly and completely in combination with the figures in the examples of the present disclosure, apparently, the examples described are merely some of, not all of the examples of the present disclosure. Here, the components of the examples of the present disclosure described and shown in figures can usually be arranged and designed according to various configurations.

Therefore, the following detailed description below of the examples of the present disclosure provided in the figures is not intended to limit the scope of protection of the present disclosure, but merely illustrates chosen examples of the present disclosure. Based on the examples of the present disclosure, all the other examples, obtained by a person ordinary skilled in the art without using creative effort, shall fall within the scope of protection scope of the present disclosure.

It should be noted that similar reference signs and letters represent similar items in the following figures. Therefore, once a certain item is defined in one figure, it is not needed to be further defined or explained in subsequent figures.

In the description of the present disclosure, it should be noted that orientational or positional relationships indicated by terms such as "upper", "lower", "inner" and "outer" are based on orientational or positional relationships as shown in the figures or orientational or positional relationships in which this inventive product is usually placed in use, merely for facilitating describing the present disclosure and simplifying the description, rather than indicating or implying that related devices or elements have to be in the specific orientation or to be configured and operated in specific the orientation, therefore, they should not be construed as limiting the present disclosure.

Besides, terms such as "first", "second" and "third" are merely for distinguishing description, but should not be construed as indicating or implying importance in relativity.

In the description of the present disclosure, it should also be noted that unless otherwise specified and defined, terms "provide", "mount", and "connect" should be construed in a broad sense. For example, the connection can be fixed connection, detachable connection, or integrated connection; it can be mechanical connection; it can be direct connection or indirect connection through an intermediate medium; and it also can also be inner communication between two elements. For a person ordinary skilled in the art, specific meanings of the above mentioned terms in the present disclosure can be understood according to specific circumstances.

Example 1

Figure 1:
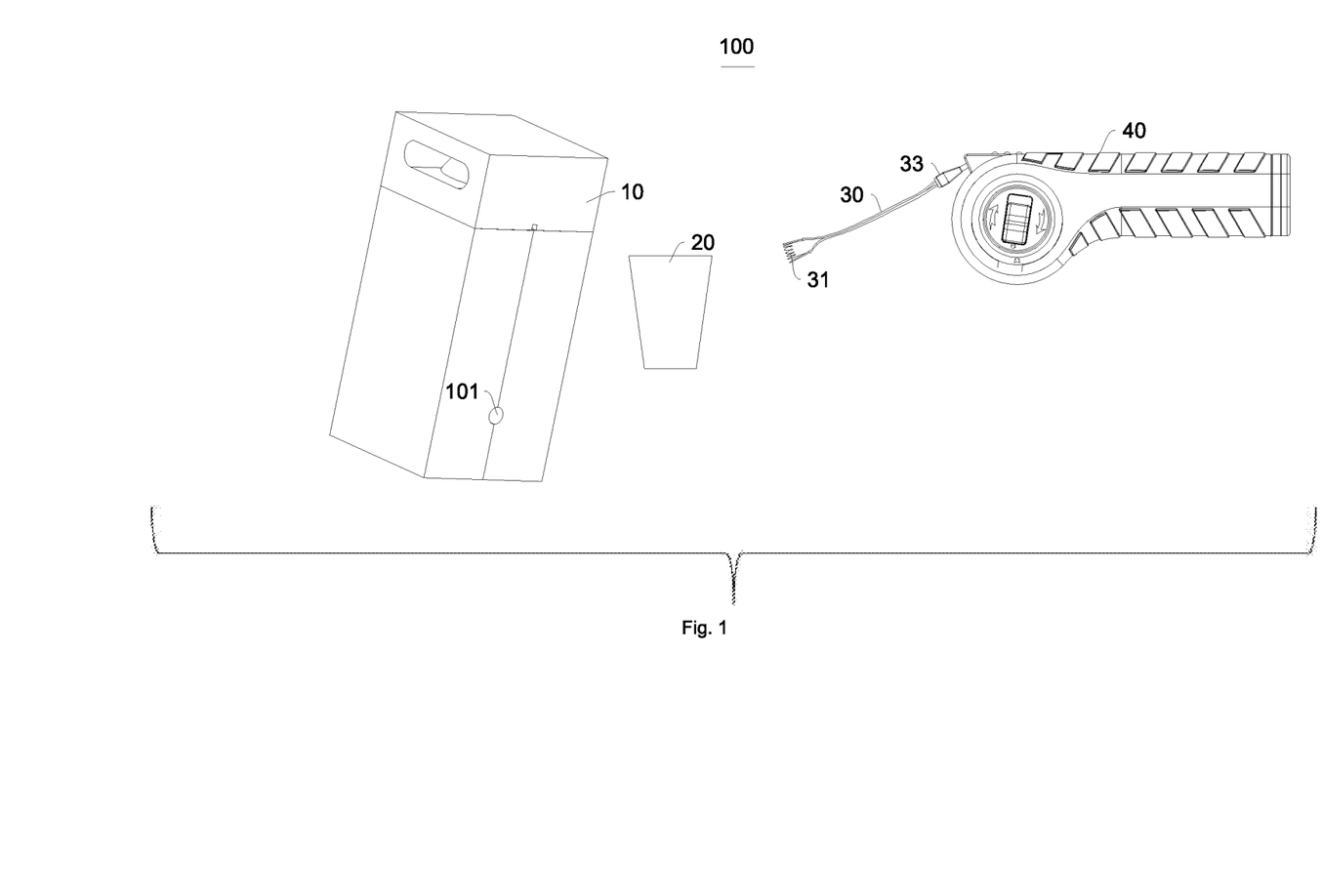
FIG. 1 is a structural schematic view of an exothermic welding apparatus provided by Example 1 of the present disclosure.
Figure 2:
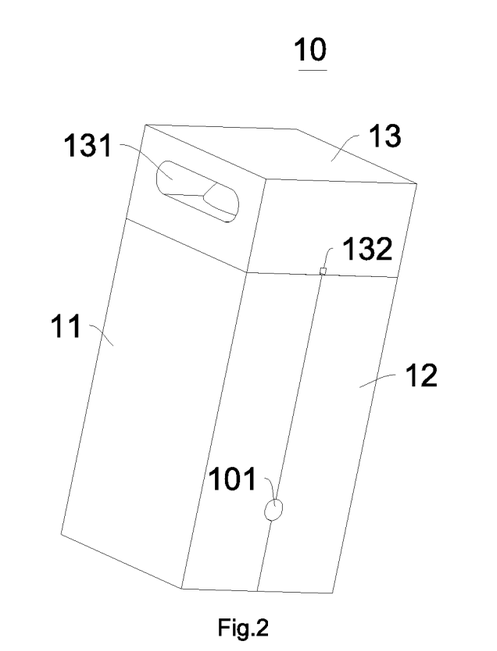
FIG. 2 is a structural schematic view of a mold provided by Example 1 of the present disclosure, from a first view.
Figure 3:
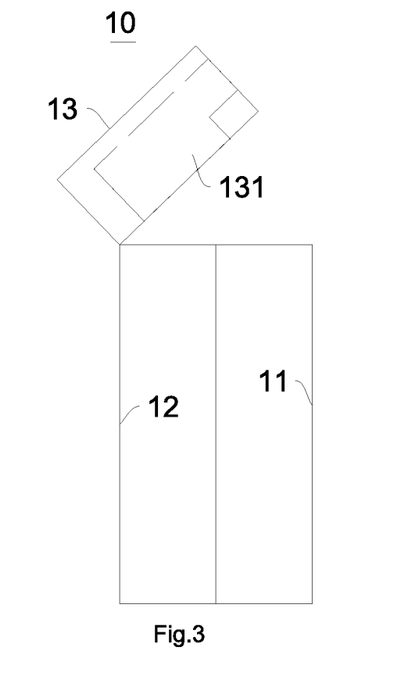
FIG. 3 is a structural schematic view of the mold provided by Example 1 of the present disclosure, from a second view.
Figure 4:
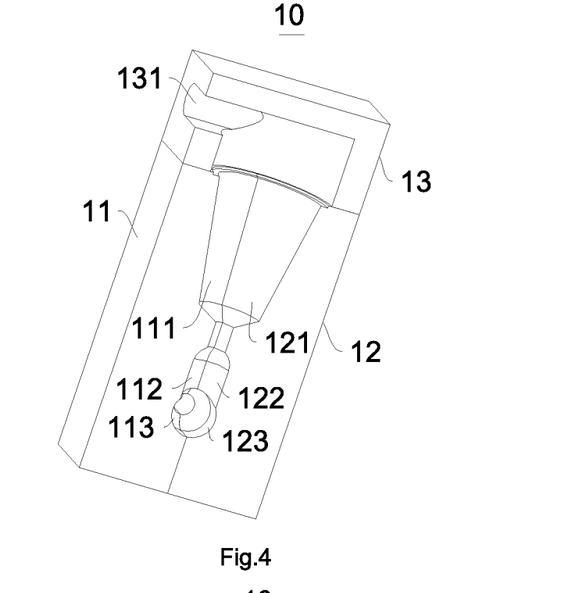
FIG. 4 is a structural schematic view of the mold provided by Example 1 of the present disclosure, from a third view.
Figure 5:
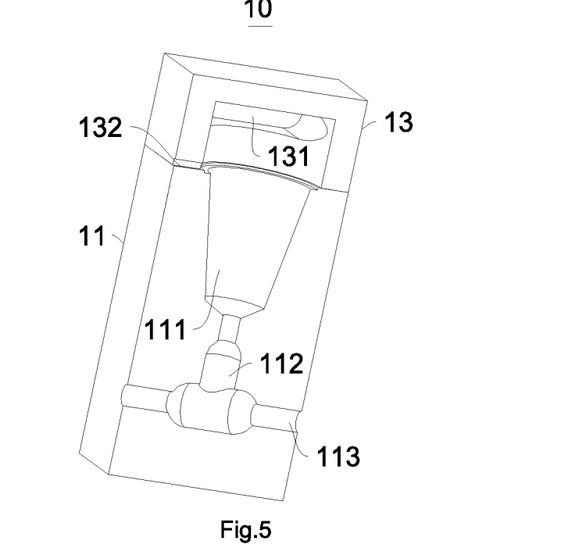
FIG. 5 is a structural schematic view of the mold provided by Example 1 of the present disclosure, from a fourth view.

Now referring to FIG. 1 to FIG. 15, this example provides an exothermic welding apparatus 100, including:

a mold 10, wherein the mold 10 has a holding space configured to accommodate an exothermic welding flux 20;

an igniter 30, wherein the igniter 30 includes a heating wire 31, a first conductor wire 32 and a first connector 33, the heating wire 31 is configured to ignite the exothermic welding flux 20 directly, one end of the first conductor wire 32 is electrically connected to the heating wire 31, and the other end of the first conductor wire 32 is electrically connected to the first connector 33; and an electronic starter 40, wherein the electronic starter 40 cooperates with the first connector 33 and is configured to supply power to the first connector 33.

The heating wire 31 can be chosen as a tungsten wire, wherein the tungsten wire has the characteristics of high temperature resistance, high hardness and good winding performance. In other examples, other high-temperature-resistance materials may also be used, such as platinum rhodium wire. In case of sufficient voltage, the temperature of the heating wire 31 can reach 1500° C. or above.

The electronic starter 40 is an electronic apparatus, which enables the heating wire 31 to generate heat by supplying power to it, thus igniting the exothermic welding flux 20. The length of the first conductor wire 32 is not limited. In specific implementation, the igniter 30 can be taken out for re-use after igniting the exothermic welding flux 20, and if the heating wire 31 is damaged, it may be replaced with a new heating wire for the next operation.

By transforming electrical energy into heat energy, the triggering temperature of thermite reaction of the exothermic welding flux 20 can be reached. The exothermic welding flux 20 in this example contains copper oxide and elemental aluminum, etc. Through redox reaction, the elemental copper is obtained via displacement to realize a welding effect. Since copper is needed for the product of this example, it is needed to obtain elemental copper by displacement. In specific implementation, different reaction materials can be replaced according to different needs.

Specifically, the exothermic welding apparatus 100 is able to ignite an exothermic welding flux 20 by supplying power with an electronic starter 40, provide a safety distance by the cooperation of an igniter 30 and an electronic starter 40 to increase the safety factor, and reduce the cost and increase the operation efficiency, as compared with the prior art.

Referring to FIG. 2 to FIG. 5, optionally, the mold 10 includes a first mold 11 and a second mold 12, wherein the first mold 11 has a first accommodating cavity 111 recessed inward, the second mold 12 has a second accommodating cavity 121 recessed inward, and when the first mold 11 cooperates with the second mold 12, the first accommodating cavity 111 communicates with the second accommodating cavity 121, to form the holding space.

When the first mold 11 and the second mold 12 are combined, a holding space is formed for placing the exothermic welding flux 20.

Optionally, the first mold 11 further has a first forming cavity 112 communicating with the first accommodating cavity 111, the second mold 12 further has a second forming cavity 122 communicating with the second accommodating cavity 121, and when the first mold 11 cooperates with the second mold 12, the first forming cavity 112 communicates with the second forming cavity 122, to form a forming space.

The forming space and the holding space in this example are relatively independent. When in place, the holding space is relatively away from the ground, and the forming space is relatively close to the ground. After the reaction of the exothermic welding flux 20, heat energy is generated, and the copper liquid flows under action of gravity into the forming space, to weld the materials that need to be welded in the forming space.

Optionally, the first mold 11 is provided with a first through slot 113, wherein the first through slot 113 runs through the first mold 11 and communicates with the first forming cavity 112; the second mold 12 is provided with a second through slot 123, wherein the second through slot 123 runs through the second mold 12 and communicates with the second forming cavity 122; and when the first mold 11 cooperates with the second mold 12, the first through slot 113 communicates with the second through slot 123, forming a through hole 101, wherein the through hole 101 is configured to allow a wire rod 201 to pass therethrough.

Figure 6:
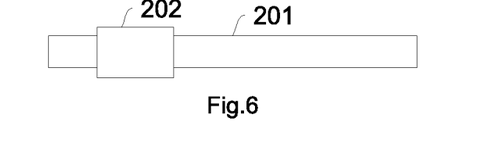
FIG. 6 is a structural schematic view of a formed product provided by Example 1 of the present disclosure.

In combination with FIG. 6, in this example, the product of exothermic welding is the wire rod 201, which passes through the through hole 101 to make a corresponding portion located in the forming space, and after the copper flows into the forming space and is cooled down, a fastening block 202 is finally formed.

Optionally, the mold 10 further includes a covering mold (cover-closing mold) 13, wherein the covering mold 13 is connected rotatably to the first mold 11 or to the second mold 12 by hinge(s), the covering mold 13 has a communication passage 131, and when the first mold 11 cooperates with the second mold 12 and the covering mold 13 covers the first mold 11 and the second mold 12, the communication passage 131 allows the holding space to communicate with the outside of the covering mold 13.

In this example, the covering mold 13 is hinged to the second mold 12, and the exothermic welding flux 20 is enabled to be located in a relatively enclosed space by means of covering. The communication passage 131 allows exhausting the gas generated by the reaction of the exothermic welding flux 20 inside, and at the same time, the heat generated by a thermite reaction can be transferred through the communication passage 131.

Optionally, the covering mold 13 is provided with a communication slot 132, wherein the communication slot 132 allows the holding space to communicate with the outside of the covering mold 13, and the communication slot 132 is configured to allow the first conductor wire 32 to pass therethrough and make the heating wire 31 located in the holding space.

When in use, the first conductor wire 32 is clamped in the communication slot 132, and then covering is performed to make the heating wire 31 located in the holding space and make the first connector 33 located outside the covering mold 13.

Figure 16:
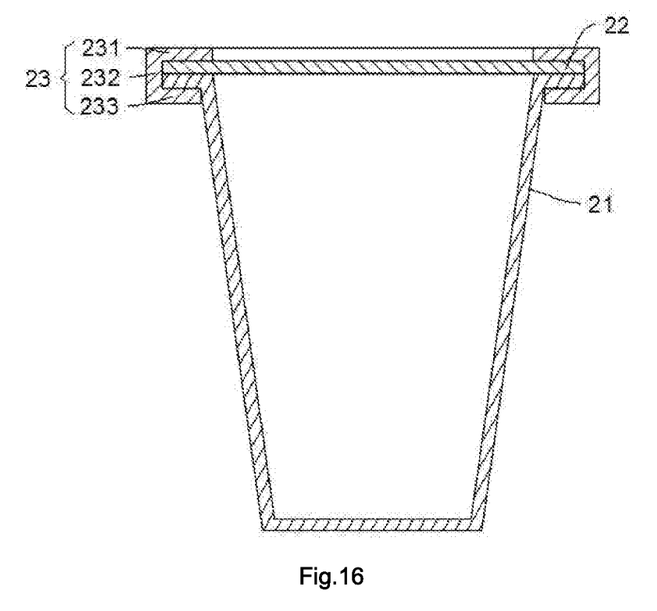
FIG. 16 is a structural schematic view of an exothermic welding flux provided by Example 1 of the present disclosure.

Optionally, the exothermic welding flux 20 is in a shape of a frustum cone, wherein the conical degree of the shape of frustum cone ranges from 10 degree to 15 degree, and is optionally 12 degree.

Referring to FIG. 16, the shell 21 of the exothermic welding flux 20 is made of copper. After an exothermic welding reaction, the copper-made shell 21 is almost all melted to become a component of a welded joint, such that the materials are sufficiently utilized and the welding slags float easily and the welded joint has a good connection performance. Moreover, fabricating the shell 21 in a shape of a frustum cone from copper requires several times of stamping, which causes a high processing difficulty, therefore it is not easy for a person ordinary skilled in the art to come up with the idea of adopting the copper-made shell 21 in a shape of a frustum cone to make the exothermic welding flux 20.

The opening of the shell 21 is sealed with an aluminum sheet 22 and mechanical crimping is performed on stainless steel ring 23 to fix the aluminum sheet 22 and the shell 21 as one piece. Specifically, the stainless steel ring 23 includes a first gripping portion 231, a transition portion 232 and a second gripping portion 233 which are connected sequentially, wherein the sections of the first gripping portion 231, the transition portion 232 and the second gripping portion 233 are combined to form a shape of U, and the first gripping portion 231 and the second gripping portion 233 are provided oppositely. The first gripping portion 231 covers the upper surface of the aluminum sheet 22, and the second gripping portion 233 is attached to the lower surface of the edge of opening of the shell 21. In this way, opening cracks caused by high temperature or aging of the aluminum sheet 22, which acts as a sealing sheet, can be prevented. Moreover, the aluminum sheet 22 can participate in the exothermic reaction together with the ingredients of formula of a thermite reaction. In this example, the holding space is in a shape of a frustum cone, thus the exothermic welding flux 20 is also in a shape of a frustum cone, the holding space and the exothermic welding flux 20 which are in a shape of a frustum cone are advantageous for the exothermic welding flux 20 to be entirely heated and sufficiently heated and melted. The shell of the exothermic welding flux 20 is made of copper, or may also be made of aluminum, steel or moisture-proof paper, etc., such that all the reaction materials are sufficiently utilized during reaction.

In combination with FIG. 7 to FIG. 10, optionally, the igniter 30 further includes fixing heads 34, wherein each fixing head 34 has a clamping space 350, one end of the heating wire 31 is clamped in the clamping space 350, and one end of the first conductor wire 32 is also clamped in the clamping space 350.

Figure 9:
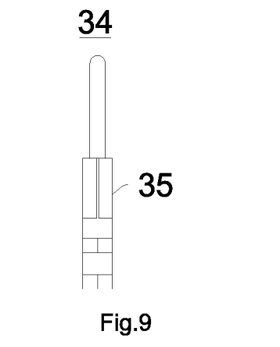
FIG. 9 is a structural schematic view of a fixing head provided by Example 1 of the present disclosure.

Due to the presence of the clamping space 350, when in use, the fixing head 34 can clamp the heating wire 31 and the first conductor wire 32 in the clamping space 350, and both of them are in contact for the purpose of conducting electricity.

Optionally, the fixing head 34 is made of a conductive material.

In this example, the fixed head 34 can be made of a material with good conductivity, such as iron, copper, etc. In other words, a conductive effect can be realized simply by clamping the heating wire and the first conductor wire.

Optionally, the fixing head 34 is provided therein with a conductive layer, one end of the heating wire 31 is in contact with the conductive layer, and one end of the first conductor wire 32 is also in contact with the conductive layer.

In another embodiment, the conductive layer can be a built-in conductive layer to achieve a conductive effect upon contact.

This conductive layer can be made of a material with good conductivity, and it can be in a shape of a sheet, so as to be better attached and fixed onto the inner surface of the fixing head 34.

Figure 10:
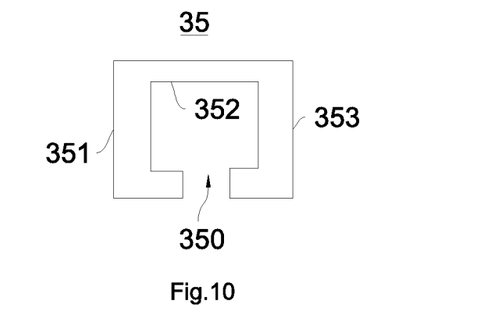
FIG. 10 is a structural schematic view of a fixing piece provided by Example 1 of the present disclosure.

In combination with FIG. 10, optionally, the fixing head 34 includes a fixing piece 35, wherein the fixing piece 35 is embodied as a rectangular frame with an opening at its bottom. The fixing piece 35 includes a first portion 351, a second portion 352 and a third portion 353 which are connected sequentially. The end of the first portion 351 away from the second portion 352 extends in a direction toward a line perpendicular to the second portion 352 at a middle point thereof. The end of the third portion 353 away from the second portion 352 extends in a direction in a direction toward a line perpendicular to the second portion 352 at a middle point thereof. The extension part of the first portion 351 and the extension part of the third portion 353 are spaced apart a certain distance, thus forming an opening. The first portion 351, the second portion 352 and the third portion 353, in combination, define the clamping space 350.

The first conductor wire 32 and the heating wire 31 can enter the clamping space 350 through the opening. After the first conductor wire 32 and the heating wire 31 are placed, a device e.g. a plier is used to clamp the first portion 351 and the third portion 353, to make it pressed on the first portion 351, such that the first conductor wire 32 and the heating wire 31 in the clamping space 350 are clamped tightly by the first portion 351 and the third portion 353.

Figure 8:
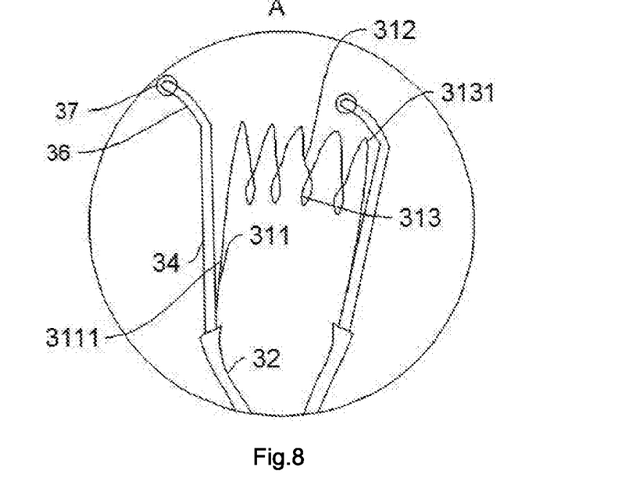
FIG. 8 is a partial enlargement schematic view of A in FIG. 7.

In combination with FIG. 8, optionally, the heating wire 31 includes a first connection portion 311, a heating portion 312 and a second connection portion 313, wherein the first connection portion 311 is connected to the positive end of the first conductor wire 32, the second connection portion 313 is connected to the negative end of the first conductor wire 32, one end of the heating portion 312 is connected to the first connection portion 311, the other end of the heating portion 312 is connected to the second connection portion 313, and the heating portion 312 is in a shape of helix. Compared with a straight line-shaped heating portion 312, a helix-shaped heating portion 312 needs a lower current for ignition, and does not need pyrophoric powder to ignite, achieving easy ignition and high igniting rate and thus having a good application prospect.

Since electric charge gathers in a place with small radius of curvature, and physical connection results in that a connection point whose radius of curvature is small is generated easily where the connection is made, concentration of electrical energy is caused. In order to avoid this problem, in this example, the first connection portion 311, the second connection portion 313 and the heating portion 312 are integrally formed by bending a tungsten wire. A helix shape ensures that the heating portion 312 has a resistance as large as possible in case of a shorter length. In order to reduce the heat generated by the first connection portion 311 and by the second connection portion 313 as much as possible, the first connection portion 311 and the second connection portion 313 are preferably made into the shape of straight bar.

In other embodiments, the heating portion 312 may be also in a straight line shape, a bended shape, etc.

It should to be noted that the use of helix winding mode in this example can ensure the uniform temperature distribution of the entire heating portion 312 in case of ensuring concentrated heat, so as to avoid occurrence of local hot brittle or hot melt fracture. In case of a lower ignition temperature, the heating portion 312 can be wound at will or even the heating portion in a shape of straight bar can be directly used, as long as it does not break easily before the exothermic welding flux 20 is ignited.

Since the heating wire 31 generates a large amount of heat, if the heating wire 31 is connected to the first conductor wire 32 with low-temperature welding modes such as tin soldering, etc., it is easy to make the point of weld melted under a high temperature, causing welding failure. Connecting the heating wire 31 to the first conductor wire 32 with a physical connection mode can not only solve the above described problem, but also effectively control the cost.

In this example, the fixing head 34 is integrally made of nickel-chromium alloy, having not only a high temperature resistance, but also a good conductivity. Of course, it can also be made of copper.

Optionally, the end of the first connection portion 311 connected to the heating portion 312 is a first connection end 3111, the end of the second connection portion 313 connected to the heating portion 312 is a second connection end 3131, and the heating portion 312 is formed by helically coiling, with a line connecting the first connection end 3111 and the second connection end 3131 taken as an axis.

This shape can effectively increase its resistance and heating temperature, thus realizing rapid heating of the exothermic welding flux 20.

Figure 7:
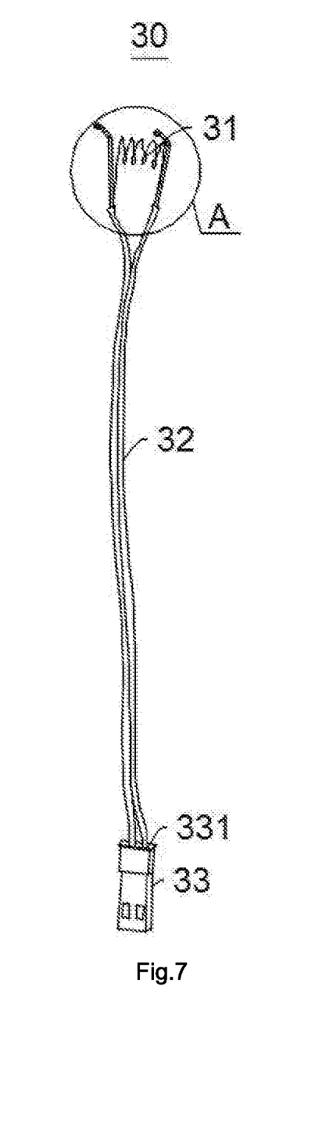
FIG. 7 is a structural schematic view of an igniter provided by Example 1 of the present disclosure.

Optionally, an end of the first connector 33 is provided with two sockets 331, the first conductor wire 32 is made by doubling (combining) single core copper wires. The positive end and the negative end of the first conductor wire 32 are respectively clamped in the two sockets 331 and are relatively fixed to the first connector 33.

Detachable connection can be realized through the sockets 331, which facilitates installing and detaching.

Referring to FIG. 7 and FIG. 8, the igniter 30 further includes positioning portions 36, wherein each positioning portion 36 is connected to the other end of one fixing head 34 which is opposite to the end thereof connected to the first conductor wire 32. The positioning portion 36 can be used for keeping sufficient contact between the heating wire 31 and the solder of the exothermic welding flux 20. The positioning portion 36 is provided bent relative to the fixing head 34. Specifically, the positioning portion 36 bends away from the plane where the two fixing heads are located. In this way, when the igniter 30 is inserted into the inside of the exothermic welding flux 20, the positioning portions 36 are able to support the inner surface of the aluminum sheet 22 which acts as a sealing sheet, so as to make the fixing heads 34 and the heating wire 31 between the fixing heads 34 a certain distance away from the aluminum sheet and inserted inside the exothermic welding flux 20, thereby ensuring that the heating wire 31 is in sufficient contact with the exothermic welding flux 20 and immediately ignites the exothermic welding flux 20, hence increasing the igniting rate of the heating wire 31 for the exothermic welding flux 20. Compared with other cases in which the heating wire and the solder are not in sufficiently contact with each other, this example has greatly increased the igniting rate.

The positioning portion 36 can be made of a non-conductive material or a conductive material. If the positioning portion 36 is made of a conductive material, correspondingly, the end of the positioning portion 36 for supporting the surface of the aluminum sheet 22 is further provided with an insulation portion 37, i.e., the insulation portion 37 is provided at the end of the positioning portion 36 which is away from the fixing head 34. The insulation portion 37 wraps the end of the positioning portion 36, thus enabling insulative connection between the positioning portion 36 and the aluminum sheet 22, to avoid short circuit of two positioning portions 36 caused by the aluminum sheet 22.

In this example, the positioning portion 36 and the fixing heads 34 are formed integrally by using the same material, and the insulation portion 37 is provided at the end of the positioning portion 36. The insulation portion 37 can be made of silica gel.

In combination with FIG. 11 to FIG. 15, optionally, the electronic starter 40 includes a casing 41 and a second conductor wire 45, wherein the casing 41 is provided therein with a wire coil 42 configured for winding of the second conductor wire 45 and a power source 44 configured to supply power to the second conductor wire 45, one side of the casing 41 is provided with a first opening 411 configured to allow the second conductor wire 45 to pass therethrough, the end of the second conductor wire 45 extends from the first opening 411 is provided with a second connector 46, and the first connector 33 is detachably connected with the second connector 46.

Figure 11:
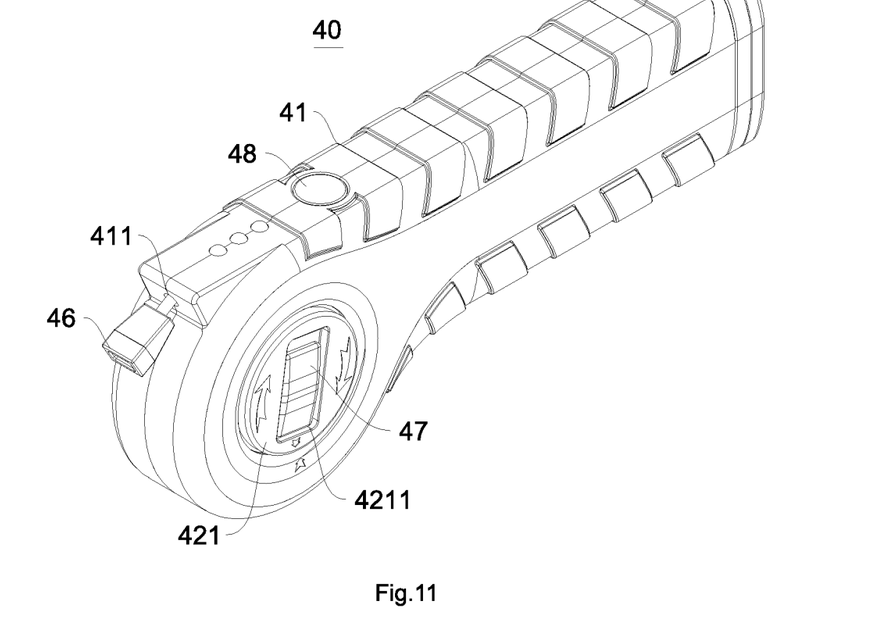
FIG. 11 is a structural schematic view of an electronic starter provided by Example 1 of the present disclosure, from a first view.
Figure 12:
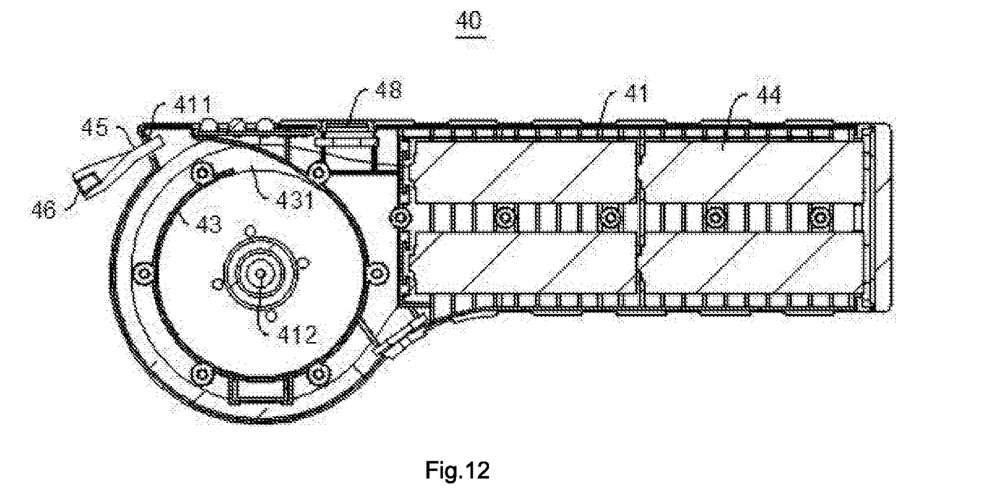
FIG. 12 is a structural schematic view of the electronic starter provided by Example 1 of the present disclosure, from a second view.

By connecting the first connector 33 to the second connector 46, supplying power with the built-in power source 44 to the heating wire 31 can be realized, and the second conductor wire 45 can also effectively lengthen the distance between a user and the mold 10.

The type of the power source 44 is not limited, it can be AA battery, AAA battery or the like, and it can also be lithium battery and other rechargeable battery. The adoption of AA batteries or AAA batteries facilitates detachment, such that the batteries of the electronic starter 40 can be removed during an air transportation to meet the requirements of air transportation, which facilitates the export or import of the electronic starter 40 to gain a broader market.

The AA batteries or AAA batteries can be purchased locally, i.e. are easily available. This example uses a battery that can be recharged repeatedly.

Figure 13:
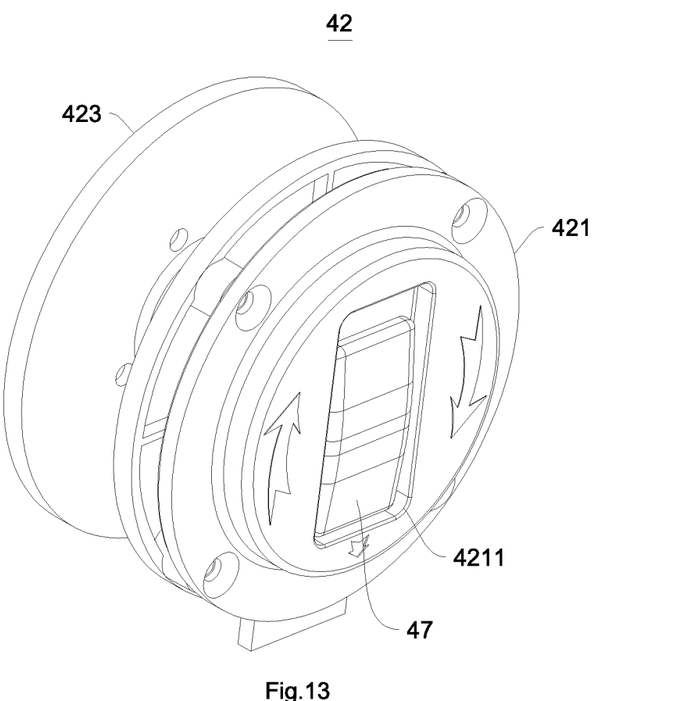
FIG. 13 is a structural schematic view of a wire coil provided by Example 1 of the present disclosure, from a first view.
Figure 14:
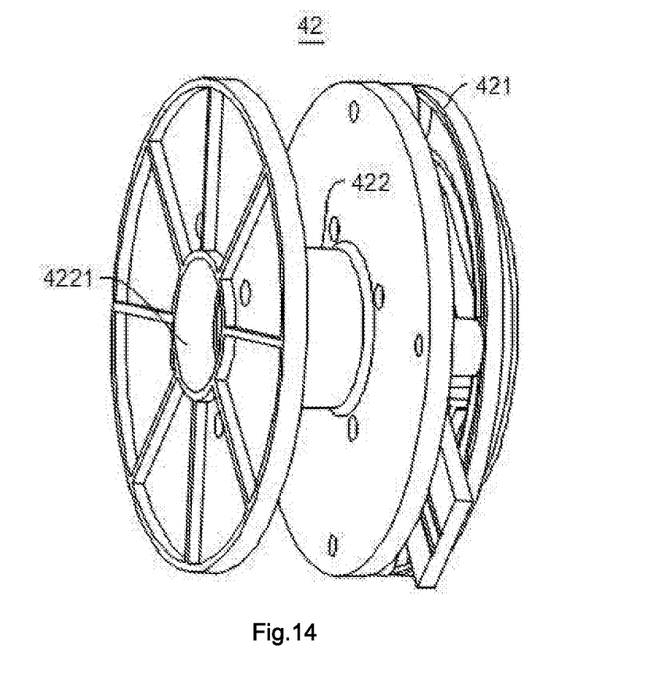
FIG. 14 is a structural schematic view of the wire coil provided by Example 1 of the present disclosure, from a second view.

The wire coil 42 can be provided with a spring or other return mechanisms, such that after the second conductor wire 45 is elongated, when the second conductor wire 45 is released, it can be automatically wound on the wire coil 42 under the action of the return mechanism.

Figure 15:
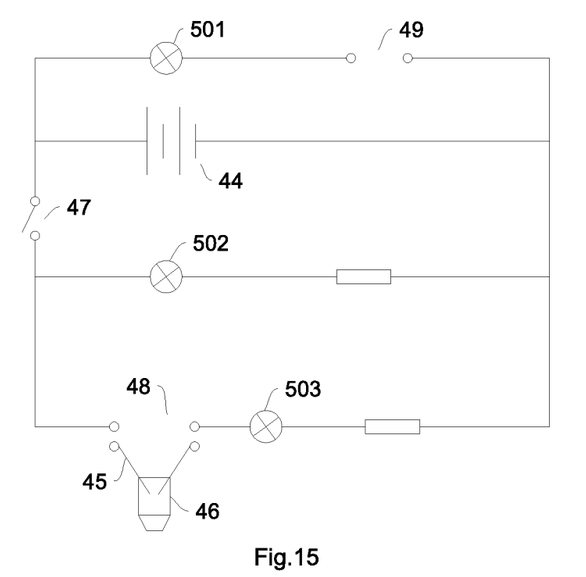
FIG. 15 is a structural schematic view of a circuit involved in an exothermic welding apparatus provided by Example 1 of the present disclosure.

Optionally, a first switch 47 is provided between the second conductor wire 45 and the power source 44.

The first switch 47 acts as the main switch.

Optionally, the wire coil 42 is rotatably connected to the casing 41, the wire coil 42 is provided with a first side plate 421, the first side plate 421 is located in the exterior of the casing 41, and the side of the first side plate 421 away from the casing 41 is provided with a groove 4211.

In this example, the wire coil 42 has a first side plate 421 and a second side plate 423 which are oppositely provided and are connected via a winding reel 422, and the winding reel 422 is mounted on a column 412 in the casing 41 to realize rotatable connection with the shell 41. The column 412 is provided at the axis of a winding groove, the column 412 is provided fixedly inside the casing 41, and the column 412 is perpendicular to the casing 41. The wire coil 42 is sleeved over the column 412, and the wire coil 42 is rotatably connected to the column 412, i.e, the wire coil 42 is rotatably connected to the casing 41. Further, torsional springs or other elastic devices can be provided on the outside of the column 412, such that the wire coil 42 can automatically return to its original position after rotating around the column 412.

An installation through hole 4221 is provided at the axis of the winding reel 422, which is sleeved over the column 412 through the installation through hole 4221 such that the wire coil 42 is rotatably connected with the column 412. The first side plate 421 and the second side plate 423 are fixedly mounted at two ends of the winding reel 422 respectively, a winding groove is formed between the first side plate 421 and the second side plate 423, and the second conductor wire 45 can be wound on the outside of the winding reel 422 via the winding groove.

This groove 4211 facilitates the user to rotate the first side plate 421 to control the extension length of the second conductor wire 45. In other words, the wire coil 42 can be easily rotated by inserting a finger into the groove 4211.

Optionally, the first switch 47 is a slide switch, and the controlling end of the slide switch is provided in the groove 4211. Alternatively, the first switch 47 is a push switch, and the controlling end of the push switch is provided in the groove 4211.

The first switch 47 in this example can be chosen as a three-wire slide switch, which realizes connection or disconnection with its corresponding circuit by sliding. Since it is needed to output a relatively large voltage through the second connector 46 and the voltage needs to be controlled within a certain range, in this example, the first switch 47 is thus provided as a three-wire slide switch. The three-wire slide switch includes a controlling end, which can thereby controls the closing or breaking of the three-wire slide switch. The controlling end is provided in the groove 4211, which can not only prevent the controlling end from being touched by mistake, but also facilitate controlling the three-wire slide switch directly after the winding or unwinding of wire.

Optionally, a second switch 48 is provided between the second connector 46 and the second conductor wire 45, which can effectively control the electric energy output of the second connector 46. The second switch 48 can be provided outside the casing 41 for easy control.

The first switch 48 acts as the auxiliary switch. The second switch 48 can be chosen as an existing connection switch.

Optionally, the wire coil 42 has a winding groove, wherein the second conductor wire 45 is wound in the winding groove. The casing 41 is provided with a circular retaining wall 43, the wire coil 42 is located inside the circular retaining wall 43, wherein the retaining wall is provided with a second opening 431 configured to allow the second conductor wire 45 to pass therethrough, and the second opening 431 is corresponding to the first opening 411. The circular retaining wall 43 is provided outside the wire coil 42, which avoids that the second conductor wire 45 is massively stacked and interlaced and thus is difficult to be pulled out.

In this example, the winding groove is correspondingly formed in an area between the first side plate 421 and the second side plate 423 and outside the winding reel 422.

In this example, the casing 41 is formed by combining two parts, which is convenient to disassemble and assemble.

The casing 41 in this example is provided thereon with a charging interface 49, to facilitate external chargers to charge the power source 44. The casing 41 is provided thereon with a charging indicator light 501, a safety indicator light 502 and an operation indicator light 503, and correspondingly, adapter resistance(s) is/are also provided.

The circuit diagram of the above described structure can be combined with FIG. 15. The power source 44 is in series with a charging circuit, and the charging indicator light 501 and the charging interface 49 are included in the charging circuit. The charging circuit is in parallel with a main circuit, and the main circuit includes an operation circuit and a discharge circuit which are parallel to each other. The first switch 47 is provided in the main circuit to control the connection and disconnection of the main circuit through the first switch 47. The operation circuit includes the safety indicator light 502 and adapter resistances, and the battery level of the power source 44 can be indicated by the safety indicator light 502. The discharge circuit includes the second switch 48 and the second connector 46, the connection and disconnection of the second connector 46 can be controlled by the second switch 48, and the operation indicator light 503 is further provided in the discharge circuit. The first switch 47 is in series with the discharge circuit, the integral connection and integral disconnection of the safety circuit and the discharge circuit can be controlled by the first switch 47. When a charger is charging the power source 44, the charging indicator light 501 lights up to indicate that charging is being performed.

When the first switch 47 is switched on, the safety indicator light 502 lights up to prompt that next operation can be performed.

When the second switch 48 is switched on, the operation indicator light 503 lights up to prompt that the power source 44 is supplying power to the second conductor wire 45.

In general, in case of an appropriate voltage, the heating wire 31 generates heat, to make the exothermic welding flux 20 reach the required temperature for reaction, and after the occurrence of a thermite reaction, the heat generated by the reaction can be provided for the sustained proceeding of the reaction, therefore the power can be cut off. If the high temperature in the reaction process causes the heating wire 31 to melt, an automatic power-off is realized.

The electronic starter 40 in this example can supply power to the igniter 30 to ignite the exothermic welding flux 20, and the igniter 40 can be miniaturized and portable by means of an ignition with the mobile power source 44. The retractable design of the second conductor wire 45 allows the distance between the electronic starter 40 and the igniter 30 to be controllable during ignition, thus ensuring the safety of persons. Moreover, the first switch 47 and the second switch 48 together controlling the ignition further ensures the safety of persons and increases the success rate of ignition.

By using the exothermic welding apparatus 100 provided by this example, the exothermic welding flux 20 can be easily ignited, improving an ignition probability while ensuring the safety of the personnel.

Example 2

This example further provides an exothermic welding method using the above described exothermic welding apparatus 100, and this exothermic welding method includes the follows.

The heating wire 31 is inserted into an exothermic welding flux 20, and the exothermic welding flux 20 is placed in the holding space. Specifically, the exothermic welding flux 20 is disposed in the holding space of the mold 10, the first conductor wire 32 of the igniter 30 passes through the communication slot 132 of the mold 10, and the covering mold 13 is cover-closed, such that the heating wire 31 is located in the holding space and the first connector is located outside the covering mold 13.

A first connector 33 cooperates with an electronic starter 40. Specifically, the first connector 33 of the igniter 30 cooperates with the second connector 46 of the electronic starter 40.

The electronic starter 40 supplies power to the first connector 33. Specifically, first, the first switch 47 of the electronic starter 40 is turned on to light up the safety indicator light 502, then the second switch 48 is turned on to light up the operation indicator light 503, indicating that the power source 44 is supplying power to the first connector 33.

The igniter 30 is powered off, and the finished product is taken out after the exothermic welding is finished.

The structure of exothermic welding apparatus 100 can be made reference to the example 1.

As for the power-off process of the igniter 30, automatic power-off can be realized by melting the heating wire 31 under a high temperature, or power-off can be performed via the manual control of the electronic starter 40.

In conclusion, the examples of the present disclosure provide an exothermic apparatus 100. The exothermic welding apparatus 100 is able to ignite an exothermic welding flux 20 by supplying power with an electronic starter 40, provides a safety distance by the cooperation of an igniter 30 and an electronic starter 40 to increase the safety factor, and reduces the cost, greatly increases the igniting rate of exothermic welding flux and increases the operation efficiency, as compared with the prior art.

The above are merely preferable examples of the present disclosure and are not used to limit the present disclosure. For one skilled in the art, various modifications and changes may be made to the present disclosure. Any amendments, equivalent replacements, improvements and so on, made without departing from the spirit and principle of the present disclosure, shall be covered by the scope of protection of the present disclosure.

INDUSTRIAL APPLICABILITY

In conclusion, the present disclosure provides an exothermic welding apparatus which has a lower use cost and effectively ensures the safety of an operator.

The invention claimed is:

1. An exothermic welding apparatus, comprising:
a mold, having a holding space configured to accommodate an exothermic welding flux;
an igniter, comprising a heating wire, a first conductor wire and a first connector, wherein the heating wire is configured to ignite the exothermic welding flux directly, one end of the first conductor wire is electrically connected to the heating wire, and the other end of the first conductor wire is electrically connected to the first connector; and
an electronic starter, configured to cooperate with the first connector and supply power to the first connector;
wherein the exothermic welding flux is in a shape of a frustum cone, a shell of the exothermic welding flux is made of one selected from the group consisting of copper, aluminum, steel and moisture-proof paper, and an opening of the shell is sealed with an aluminum sheet.

2. The exothermic welding apparatus according to claim 1, wherein a stainless steel ring is used to fix the aluminum sheet and the shell to form one piece.

3. The exothermic welding apparatus according to claim 2, wherein the stainless steel ring comprises a first gripping portion, a transition portion and a second gripping portion which are connected sequentially, the first gripping portion and the second gripping portion are provided oppositely, the first gripping portion covers an upper surface of the aluminum sheet, and the second gripping portion is attached to a lower surface of an edge of the opening of the shell.

4. The exothermic welding apparatus according to claim 1, wherein the igniter further includes fixing heads, each fixing head has a clamping space, an end of the heating wire is clamped in the clamping space, and an end of the first conductor wire is also clamped in the clamping space.

5. The exothermic welding apparatus according to claim 4, wherein the igniter further comprises positioning portions, each positioning portion is connected at the other end of one fixing head which is opposite to one end thereof connected with the first conductor wire, and the positioning portion is used for keeping sufficient contact between the heating wire and a solder of the exothermic welding flux.

6. The exothermic welding apparatus according to claim 5, wherein the positioning portion bends in a direction away from a plane where two fixing heads are located.

7. The exothermic welding apparatus according to claim 5, wherein the positioning portion is made of a conductive material, and an end of the positioning portion away from the fixing head is provided with an insulation head.

8. The exothermic welding apparatus according to claim 4, wherein the fixing head is provided therein with a conductive layer, an end of the heating wire is in contact with the conductive layer, and an end of the first conductor wire is also in contact with the conductive layer.

9. The exothermic welding apparatus according to claim 4, wherein the fixing head comprises a fixing piece, the fixing piece is embodied as a rectangular frame with an opening at its bottom, the fixing piece comprises a first portion, a second portion and a third portion which are connected sequentially, wherein an end of the first portion away from the second portion extends in a direction toward a line perpendicular to the second portion at a middle point of the second portion, an end of the third portion away from the second portion extends in a direction toward a line perpendicular to the second portion at a middle point of the second portion, and the first portion, the second portion and the third portion, in combination, define the clamping space.

10. The exothermic welding apparatus according to claim 1, wherein the heating wire comprises a first connection portion, a heating portion and a second connection portion, the first connection portion is connected to a positive end of the first conductor wire, the second connection portion is connected to a negative end of the first conductor wire, one end of the heating portion is connected to the first connection portion, the other end of the heating portion is connected to the second connection portion, and the heating portion is in a shape of helix.

11. The exothermic welding apparatus according to claim 10, wherein an end of the first connection portion connected to the heating portion is a first connection end, an end of the second connection portion connected to the heating portion is a second connection end, and the heating portion is formed by helically coiling, with a line connecting the first connection end and the second connection end taken as an axis.

12. The exothermic welding apparatus according to claim 1, wherein an end of the first connector is provided with two sockets, and the positive end and the negative end of the first conductor wire are respectively clamped in the two sockets and are relatively fixed to the first connector.

13. The exothermic welding apparatus according to claim 1, wherein the electronic starter comprises a casing and a second conductor wire, the casing is provided therein with a wire coil configured for allowing the second conductor wire to be wound and a power source configured to supply power to the second conductor wire, one side of the casing is provided with a first opening configured to allow the second conductor wire to pass therethrough, an end of the second conductor wire extending from the first opening is provided with a second connector, and the first connector is detachably connected with the second connector.

14. The exothermic welding apparatus according to claim 13, wherein a first switch is provided between the second conductor wire and the power source.

15. The exothermic welding apparatus according to claim 14, wherein the wire coil is rotatably connected to the casing, the wire coil is provided with a first side plate, the first side plate is located at the outside of the casing, and one side of the first side plate away from the casing is provided with a groove.

16. The exothermic welding apparatus according to claim 15, wherein the first switch is a slide switch, and a controlling end of the slide switch is provided in the groove.

17. The exothermic welding apparatus according to claim 13, wherein a second switch is provided between the second connector and the second conductor wire.

18. An exothermic welding method, using an exothermic welding apparatus according to claim 1, wherein the exothermic welding method comprises:
   inserting a heating wire into an exothermic welding flux, and placing the exothermic welding flux in the holding space;
   making a first connector cooperate with an electronic starter;
   making the electronic starter supply power to the first connector; and
   making an igniter powered off, waiting until exothermic welding is finished and taking out a finished product.

* * * * *

UNITED STATES PATENT AND TRADEMARK OFFICE
CERTIFICATE OF CORRECTION

PATENT NO. : 10,758,997 B2  
APPLICATION NO. : 16/021887  
DATED : September 1, 2020  
INVENTOR(S) : Xudong Yu et al.

Page 1 of 1

It is certified that error appears in the above-identified patent and that said Letters Patent is hereby corrected as shown below:

On the Title Page

At item (73), Line 3, "LTD. . .," should be -- LTD., --.

Signed and Sealed this  
Twelfth Day of January, 2021

Andrei Iancu  
*Director of the United States Patent and Trademark Office*